(12) United States Patent
Lim

(10) Patent No.: US 6,481,162 B2
(45) Date of Patent: Nov. 19, 2002

(54) CENTER CHANNEL STRUCTURE HAVING AN H-SHAPED CROSS-SECTION FOR A VEHICLE DOOR

(75) Inventor: Nam Hyeok Lim, Gunpo-shi (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 09/727,437

(22) Filed: Nov. 30, 2000

(65) Prior Publication Data

US 2001/0002520 A1 Jun. 7, 2001

(30) Foreign Application Priority Data

Dec. 7, 1999 (KR) .............................. 99-55519

(51) Int. Cl.⁷ .................................................. B60J 1/17
(52) U.S. Cl. ........................................... 49/374; 49/372
(58) Field of Search .................... 49/348, 349, 375, 49/374, 372, 440; 296/146.2

(56) References Cited

U.S. PATENT DOCUMENTS

| | | | | |
|---|---|---|---|---|
| 2,361,609 A | * | 10/1944 | Doty ............................ | 49/144 |
| 3,162,281 A | * | 12/1964 | Kraska et al. ................ | 49/374 |
| 3,383,800 A | * | 5/1968 | Sturtevant .................... | 49/428 |
| 3,385,000 A | * | 5/1968 | Sturtevant et al. ............ | 49/440 |
| 3,584,415 A | * | 6/1971 | Keefe et al. .................. | 49/348 |
| 4,020,593 A | * | 5/1977 | Salomon et al. .............. | 49/103 |
| 4,167,834 A | * | 9/1979 | Pickles ........................ | 49/358 |
| 4,252,989 A | * | 2/1981 | Blumenthal .................. | 174/48 |
| 4,299,057 A | * | 11/1981 | Hagemann et al. ........... | 49/375 |
| 4,586,290 A | * | 5/1986 | Juechter ....................... | 49/348 |
| 4,953,331 A | * | 9/1990 | Ziegler et al. ................ | 52/208 |
| 5,557,890 A | * | 9/1996 | Levy et al. ................... | 49/502 |
| 5,560,152 A | * | 10/1996 | Haner ........................... | 49/348 |
| 6,250,017 B1 | * | 6/2001 | Tessier ......................... | 49/440 |

* cited by examiner

Primary Examiner—Gregory J. Strimbu
(74) Attorney, Agent, or Firm—Christie, Parker & Hale, LLP

(57) ABSTRACT

A center channel having H-shaped cross section is attached to a chassis of a door and to a door panel of a vehicle. The center channel is fixed to the door chassis and panel by upper and lower brackets fixed thereto. The upper bracket is L-shaped and extends laterally from the upper end of the center channel wherein an engagement portion of the upper bracket is generally parallel to a side wall of a glass run channel of the door chassis. The upper bracket is fixed to the door chassis by a screw through the glass run channel, the door chassis and the upper bracket engagement portion.

19 Claims, 3 Drawing Sheets

CENTER CHANNEL STRUCTURE HAVING AN H-SHAPED CROSS-SECTION FOR A VEHICLE DOOR

CROSS-REFERENCE TO RELATED APPLICATION

This application claims priority of Korea patent Application No. 1999-55519, filed on Dec. 7, 1999.

BACKGROUND OF THE INVENTION

1. Field of the Invention

The present invention relates to a center channel fixation and more particularly to a center channel structure fixed to the door in a vehicle, for guiding the window glass of the rear door.

2. Description of the Related Art

Generally, the doors of vehicles have window glass 2 at the upper side, for allowing the passengers to watch outside. The passengers may ascend or descend the window glass 2 with use of a window regulator (not shown) installed within the door 1. The ascending/descending operation is achieved by guiding a glass run channel installed along a door chassis 1a, as shown in FIG. 1.

While the front doors in the vehicle have one window each, the rear doors are divided into two sections of window glasses 2a and 2b with respect to the center channel 3 extending to the door panel 1b from the intermediate side of the door chassis 1a. The window glass 2a in the forward direction with respect to the center channel 3 is controlled up and down, while the window glass 2b in the rearward direction with respect to the center channel 3 is fixed to the door.

FIG. 2 shows a perspective view of the center channel 3 of rear door 1. The center channel 3 of a H-shape is fixed to the rear door 1 by engagement of the door chassis 1a and the inner panel 1b with the upper and lower brackets 4 and 5.

The upper bracket 4 has a braced end with the other end open, i.e. ⌈, for fixing the upper end to the door chassis 1a. A transverse portion 4a of the bracket 4 is disposed to oppose the upper end of the center channel 3 with a predetermined interval. A vertical portion 4b is fixed to the upper end of the center channel 3. An engagement hole 4' is formed at the transverse portion 4a of the bracket 4.

The bracket 4 is disposed through the glass run channel 6 at the lower side of the door chassis 1a and engaged by a screw 7 with the door chassis 1a. The corresponding portion of the glass run channel 6 is formed open cut through the bracket 4.

This type center channel structure as conventionally used has disadvantages that the glass run channel 6 should be cut through so as to engage the bracket to the door chassis. As the glass run channel 6 should be cut, there is a possibility of intrusion of other substances such as rainwater into the cut portion of the glass run channel 6. Moreover, the draught noise due to air intrusion into the cut portion may occur. These problems also cause the passengers to feel discomfortable.

SUMMARY OF THE INVENTION

The present invention is derived to solve the above disadvantages of the conventional center channel structure and has an object to provide a center channel fixation structure in engagement with the door chassis having the center channel without cutting through the glass run channel.

It is the other object of the present invention to provide a center channel fixation structure to prevent rainwater and draught noise, thereby improving passenger's comfort and product reliability.

In order to achieve the objects of the present invention, there is provided a center channel having a H-shaped section installed in perpendicular on a chassis of the door to the panel and serving to divide the door glass into two portions. The center channel is fixed to the door chassis and panel by upper and lower brackets fixed thereto. Upper bracket extends in lateral from the upper end of the center channel wherein an engagement is in parallel to a wall of a glass run channel of the inner door chassis. The upper bracket is fixed to the door chassis by a screw through the walls of the glass run channel and the door chassis.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DESCRIPTION OF THE PREFERRED EMBODIMENTS

Figure 1:
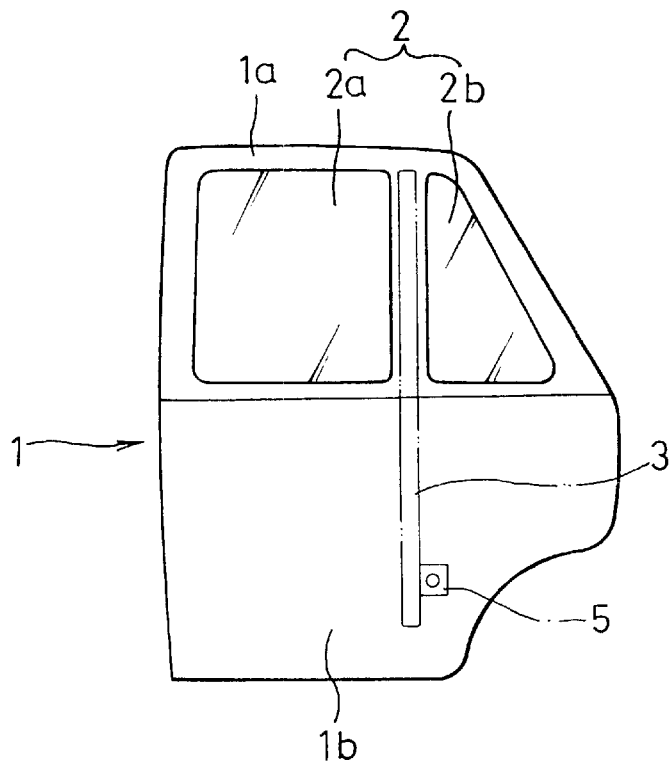
FIG. 1 is a side view showing the conventional center channel installed at the rear door of the vehicle.
Figure 2:
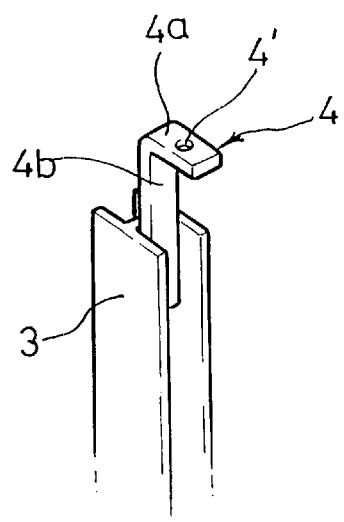
FIG. 2 is a perspective view of the upper portion of the conventional center channel of FIG. 1.
Figure 3:
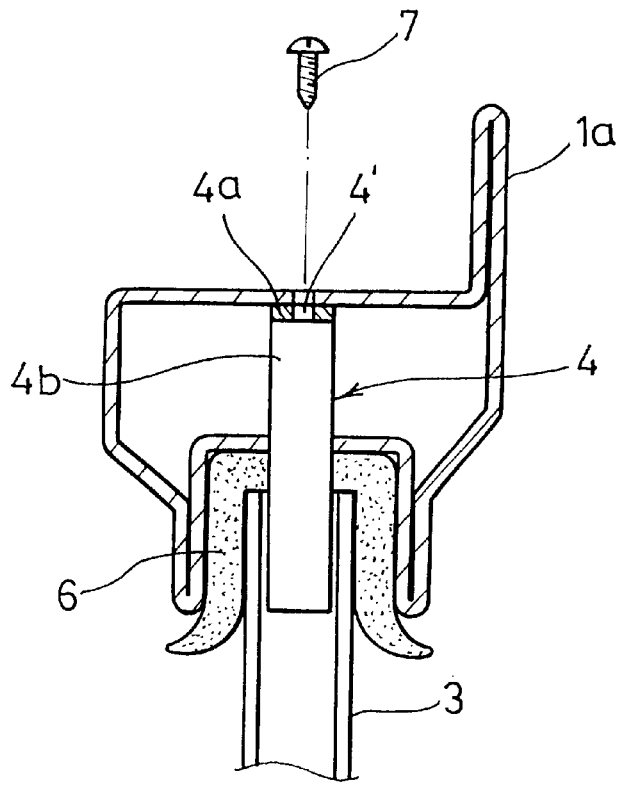
FIG. 3 is a sectional view of the upper portion of the conventional center channel of FIG. 1.
Figure 4:
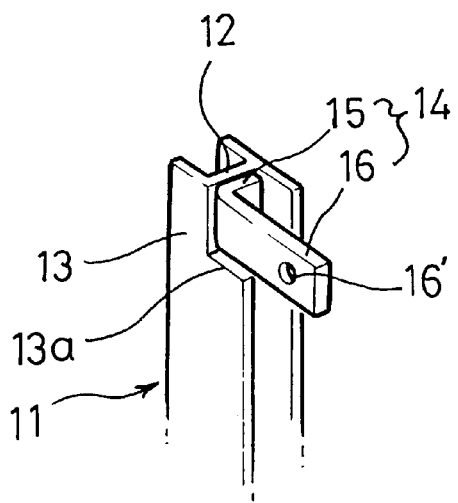
FIG. 4 is a perspective view showing the upper portion of the center channel structure of the present invention.
Figure 5:
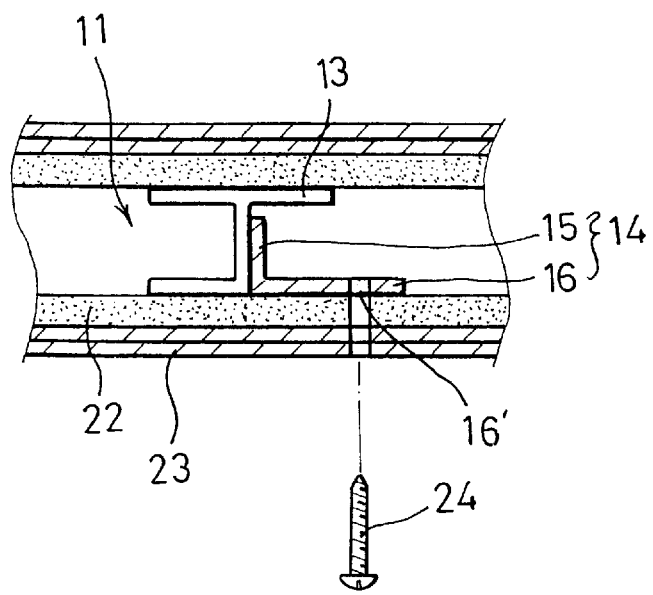
FIG. 5 is a lateral sectional view of the center channel of FIG. 4.
Figure 6:
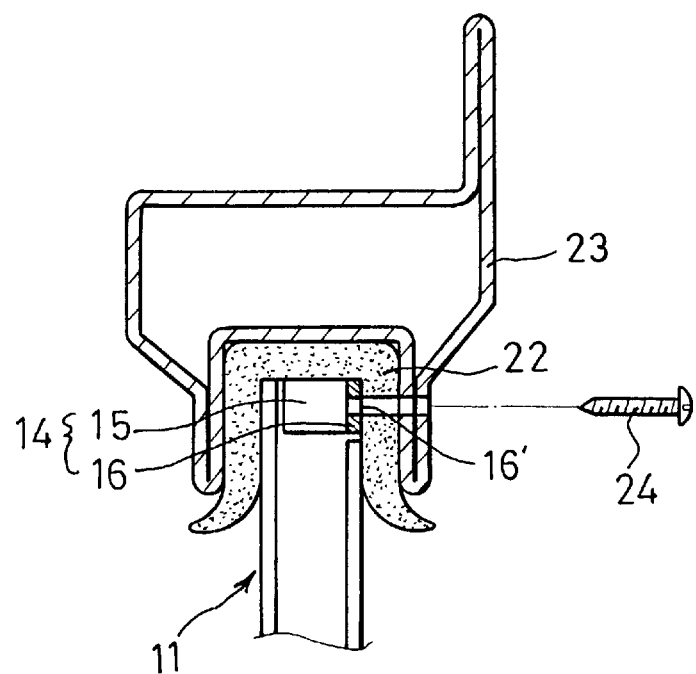
FIG. 6 is a longitudinal sectional view of the center channel of FIG. 4.

FIGS. 4 to 6 show the center channel structure of the present invention.

As shown in FIG. 4, the center channel 11 is formed in H-shape having two wings 13 in opposite with respect to a shaft 12. An end of one wing 13 is cut to form a cut portion 13a.

The bracket 14 in L-shape includes a wing fixation 15 and an engagement 16. The wing fixation 15 is fixed to the shaft 12. The engagement 16 is fixed to extend along the wing 13 in place of the cut portion 13a at the wing 13.

At the engagement 16, a thread hole 16' is formed for engagement with the screw 24.

The engagement 16 of the bracket 14 is adhered to one side of the glass run channel 22 inserted to the door chassis 23 and fixed to the door chassis 23 by the screw 24 which protrudes the side walls of the glass run channel 22 and the door chassis 23. The engagement 16 fills the cut portion 13a of the center channel 11, to be fixed to the glass run channel 22 without a predetermined interval or overlapping with the wing 13.

The fixing structure of the center channel 11 to the door panel by the lower bracket is omitted.

As described above, the engagement of the upper bracket extends in parallel with the side wall of the glass run channel and is engaged to the door chassis by the screw through the side wall of the glass run channel and the door chassis.

While the conventional structure requires the glass run channel cut through the bracket so as to engage the bracket to the door chassis, the present invention has advantages to prevent intrusion of other substances such as rainwater into the cut portion between the glass run channel and draught noise due to air intrusion into the cut portion, thereby improving passenger's comfort and assembling workability.

What is claimed is:

1. A vehicle door structure comprising:
   a vehicle door chassis;
   a door panel; and
   a center channel structure coupled to the vehicle door chassis between two windows, the center channel structure comprising,
   a first panel,
   a second panel opposite the first panel,
   a third panel interconnecting the first and second panels, wherein the three panels define a generally H-shaped cross-section in a first plane, and
   a bracket comprising a first leg coupled to the third panel and a second leg extending from the first leg, wherein the bracket comprises a generally L-shaped cross-section in a second plane parallel to the first plane.

2. A door structure as recited in claim 1 wherein the first panel is generally parallel with and spaced apart from the second panel and wherein the second leg is generally parallel with the second panel.

3. A door structure as recited in claim 2 wherein a portion of the second panel comprises a cut-out and wherein the second leg extends along the cutout in a direction generally parallel to the second panel.

4. A door structure as recited in claim 3 wherein the second leg comprises an opening for accommodating a fastener.

5. A door structure as recited in claims 3 wherein the second leg is coupled to the vehicle door chassis.

6. A door structure as recited in claim 5 further comprising a glass run channel coupled to the door chassis, wherein the second leg is coupled to the glass run channel.

7. A door structure as recited in claim 6 further comprising a fastener fastening the vehicle door chassis, the glass run channel and the second leg together.

8. A door structure as recited in claim 6 wherein the center channel structure further comprises a second bracket coupled to the door panel.

9. A door structure as recited in claim 6 wherein the bracket is coupled to an upper end potion of the third panel and wherein an upper end portion of the center channel structure including the bracket is fitted within the glass run channel.

10. A vehicle door having two windows and a center channel structure coupled to the vehicle door between the two windows, the structure comprising:
    a first panel;
    a second panel opposite the first panel;
    a third panel interconnecting the first and second panels, wherein the three panels define a generally H-shaped cross-section in a first plane;
    a bracket comprising a first leg coupled to the third panel and a second leg extending from the first leg, wherein the bracket has a generally L-shaped cross-section in a second plane parallel to the first plane.

11. A vehicle door as recited in claim 10 wherein the second leg is generally parallel with the second panel.

12. A vehicle door as recited in claim 10 wherein a portion of the second panel comprises a cut-out and wherein the second leg extends along the cutout in a direction generally parallel to the second panel.

13. A vehicle door as recited in claim 12 wherein the second leg comprises an opening for accommodating a fastener transverse to the second panel.

14. A vehicle door as recited in claim 12 wherein the second leg is coupled to a vehicle door chassis.

15. A vehicle door as recited in claim 14 wherein the second leg is coupled to a glass run channel.

16. A vehicle door as recited in claim 15 further comprising a fastener fastening the vehicle door chassis, the glass run channel and the second leg together.

17. A vehicle door having two windows and a center channel structure coupled to the vehicle door between the two windows, the structure comprising:
    a first panel;
    a second panel opposite the first panel and comprising a cut-out;
    a third panel interconnecting the first and second panels;
    a generally L-shaped bracket comprising a first leg coupled to the third panel and a second leg extending from the first leg along the cutout in a direction generally parallel to the second panel.

18. A vehicle door as recited in claim 17 wherein the second leg comprises an opening for accommodating a fastener transverse to the second panel.

19. A vehicle door as recited in claim 18 further comprising a fastener fastening together a vehicle door chassis, a glass run channel and the second leg through a second leg opening.

* * * * *